United States Patent
Russell

(10) Patent No.: US 11,401,666 B2
(45) Date of Patent: Aug. 2, 2022

(54) RAISED PAVEMENT MARKERS REMOVAL SYSTEM AND METHOD

(71) Applicant: Fred Russell, Lakeland, FL (US)

(72) Inventor: Fred Russell, Lakeland, FL (US)

( * ) Notice: Subject to any disclaimer, the term of this patent is extended or adjusted under 35 U.S.C. 154(b) by 485 days.

(21) Appl. No.: 16/716,403

(22) Filed: Dec. 16, 2019

(65) Prior Publication Data

US 2021/0180273 A1  Jun. 17, 2021

(51) Int. Cl.
  *E01C 23/088*  (2006.01)
  *E01H 1/04*  (2006.01)
  *H04N 5/225*  (2006.01)
  *G06T 7/521*  (2017.01)
  *B60Q 9/00*  (2006.01)
  *H04N 5/247*  (2006.01)
  *G06T 7/70*  (2017.01)

(52) U.S. Cl.
  CPC ............ *E01C 23/0885* (2013.01); *B60Q 9/00* (2013.01); *E01H 1/045* (2013.01); *G06T 7/521* (2017.01); *G06T 7/70* (2017.01); *H04N 5/2253* (2013.01); *H04N 5/2256* (2013.01); *H04N 5/247* (2013.01); *G06T 2207/10028* (2013.01)

(58) Field of Classification Search
  CPC ...... B60Q 1/24; B60Q 1/247; B60Q 2800/20; B60Q 9/00; E01C 2301/50; E01C 23/088; E01C 23/0885; E01C 23/0946; E01C 23/0993; E01C 23/127; E01H 1/045; E01H 1/04; E01H 1/047; E01H 1/05; E01H 1/053; E01H 1/056; G06T 7/70; G06T 7/521; H04N 5/2256; H04N 5/2253; H04N 5/247
  See application file for complete search history.

(56) References Cited

U.S. PATENT DOCUMENTS

| | | |
|---|---|---|
| 5,236,278 A | 8/1993 | Dickson |
| 5,605,381 A | 2/1997 | Schmoock, Jr. et al. |
| 5,890,772 A | 4/1999 | Mravyan |
| 6,042,299 A | 3/2000 | Cooper |
| 6,619,755 B1 | 9/2003 | Christensen et al. |
| 7,674,158 B2 | 3/2010 | Crocker |
| 8,157,473 B2 | 4/2012 | Johnson |
| 8,360,827 B1 | 1/2013 | Coughtry |

(Continued)

FOREIGN PATENT DOCUMENTS

KR  2017121428 A  * 11/2017  ........... B24B 29/005

*Primary Examiner* — Nathnael Aynalem
(74) *Attorney, Agent, or Firm* — Keaty Law Firm LLC

(57) ABSTRACT

A raised pavement markers removal vehicle system and method for the removal of raised pavement markers from a roadway. As the vehicle is driven along a roadway, a grinder unit alongside the forward portion of the vehicle grinds away the raised pavement markers to be removed. A sensing unit senses the relative lateral positions of the grinder unit and the upcoming raised pavement markers to be removed. A controller receives position information from the sensing unit and sends appropriate commands to an alignment adjuster to match the lateral position of the grinder unit to the lateral position of the upcoming pavement markers to be removed. After removal by grinding, the debris from the removed raised pavement markers is swept from the roadway into a sweeper-hopper unit for transport to a suitable unloading place. A warning board mounted at the rear of the sweeper-hopper unit provides a visual warning to other users of the road.

20 Claims, 9 Drawing Sheets

(56) References Cited

U.S. PATENT DOCUMENTS

| | | | |
|---|---|---|---|
| 2006/0165487 A1* | 7/2006 | Manor | E01C 23/08 404/94 |
| 2009/0241999 A1 | 10/2009 | Crocker | |
| 2019/0136488 A1* | 5/2019 | Cochran | E01C 23/0933 |
| 2020/0149231 A1* | 5/2020 | Lo Vaglio | E01C 23/088 |
| 2021/0114122 A1* | 4/2021 | Crocker | E01C 23/0993 |

\* cited by examiner

RAISED PAVEMENT MARKERS REMOVAL SYSTEM AND METHOD

BACKGROUND OF THE INVENTION

This invention provides a raised pavement markers removal vehicle system and method for the removal of raised pavement markers from a roadway.

Raised pavement markers, often reflective, are in widespread use on roadways. They are attached very firmly to the roads. On occasion, it is necessary to remove the raised pavement markers because of circumstances such as resurfacing, re-purposing, or re-designation of lanes and/or because existing markers have been damaged, such as occurs in snowplowing. Removal of the markers requires destruction of the markers. The debris generated by the removal of markers should be collected and handled separately from other road-work debris because debris from markers is likely to be sharp and dangerous and because the debris might be useful and recyclable for other purposes.

Individual raised pavement markers are small compared to other components of the roadway and can be removed with a grinder having a width of only several inches. Using a grinder of greater width introduces a likelihood of damaging the road itself or adjacent structures. But using a grinder having the proper narrow width requires more precise placement of the grinder to effectively remove the marker and to avoid damaging the roadway or other structures.

What is needed is a raised pavement markers removal vehicle to increase the speed, precision, efficiency, and safety of removal.

U.S. Pat. No. 5,236,278 for a "Road Surface Treating Apparatus," issued on Aug. 17, 1993 to inventor Wayne E. Dickson, provides for a road surface treating apparatus including a wheel-supported framework having forwardly extending arms pivotally carried thereon. The arms have a transversely extending tool bar mounted to their forward ends. A tool-supporting frame is detachably and adjustably mounted on the tool bar. A cutter drum housing is pivotally mounted on the tool-supporting frame for floating pivotation about a horizontally extending, fore-and-aft axis to facilitate side-to-side rocking movement of the drum housing. A cutter drum is rotatably mounted in the housing and carries circumferentially spaced rows of cutter blades each mounted for rotation about a horizontal axis. A pair of horizontally spaced, shock absorber units is connected between the housing and tool-supporting frame to damp and smooth the side-to-side rocking movement of the housing and the cutter drum mounted therein.

US Patent Application Publication No. 2009/0241999 for a "Modular Stripe Removal System," published on Oct. 1, 2009 by inventor James P. Crocker, discloses a stripe removal or cleaning system for removing coatings or markings from hard surfaces, such as roadways, by high pressure liquid. The system employs a liquid reservoir connected to a high pressure fluid pump for directing ultra high pressure water through a blast head to remove the coatings or markings. The blast head is mounted on a vehicle. Water and debris removed from the surfaces are delivered to a vacuum tank where the debris is separated from the water. The vacuum is maintained in the vacuum tank by a high power vacuum pump. The entire removal or cleaning system is mounted on a skid, thus enabling it to be transported to any location and used on vehicles which do not have to be dedicated to stripe removal or surface cleaning.

U.S. Pat. No. 5,890,772 for a "Grinding Machine for Removing Markings from Paved Surfaces and Grinder for Same," issued on Apr. 6, 1999 to inventor Michael Mravyan, provides for a grinding machine to remove markings such as painted lines from a paved surface, and includes a wheeled carriage to be moved over the paved surface. A grinder is positioned beneath the carriage to contact and grind the paved surface. A suspension acts between the carriage and the grinder to allow the grinder to follow the profile of the paved surface as the grinding machine is moved thereover. A drive is supported by the carriage to actuate the grinder.

U.S. Pat. No. 8,360,827 for a "Road Marking Removal System and Method," issued on Jan. 29, 2013 to inventor Richard J. Coughtry, provides for a road marking removal system creating a blasting mixture by injecting particulate matter from a media hopper into flowing compressed air. The blasting mixture is directed at a road marking via a blasting nozzle. The nozzle discharges the blasting mixture from within a marking removal head housing. A vacuum is applied to an interior of the marking removal head housing for collecting the residual material created by the removal process. The residual material consists of particulate matter, road marking debris, and the like. The collected material can optionally be sorted with material of an acceptable size being reclaimed and forwarded to the media hopper for reuse. The road marking removal system can be manually operated being integrated into a cart, or remotely operated when integrated into a vehicle.

U.S. Pat. No. 7,674,158 for a "Combined Grinder and Water Blaster for Stripe Removal System," issued on Mar. 9, 2010 to inventor James P. Crocker, provides for a self-propelled mobile marking removal system that comprises a mobile vehicle assembly including a chassis, a high pressure liquid pump in fluid connection with a liquid reservoir contained within said chassis, said high pressure liquid pump is further in fluid connection with a blast head, said blast head having at least one high pressure nozzle for delivering liquid at high pressure to a marked surface, a waste removal hose fluidly coupled with said blast head and a sump for collection of liquid and debris, said blast head positionable along a left or a right side of said chassis, a mechanical abrasion means, said mechanical abrasion means positionable along a left or a right side of said chassis in front of said blast head, said mechanical abrasion means is constructed and arranged to substantially remove marking material protruding above said marked surface and said blast head constructed and arranged to substantially remove any marking material extending below said marked surface. As a result of this arrangement the self-propelled vehicle can travel at speeds up to approximately 25 MPH.

U.S. Pat. No. 8,157,473 for an "Apparatus and Method for Highway Marker Removal," issued on Apr. 17, 2012 to inventor Steven C. Johnson, provides for an apparatus for removing markers from pavement, and includes a prime mover and an implement adjustably coupled to the prime mover. The implement includes a body, a tool having a working tip, a leveling pointer pivotably coupled to the body such that the leveling pointer moves relative to the body under the force of gravity, and a target indicium disposed near the leveling pointer. In some embodiments, the apparatus may further include a camera focused on the working tip of the tool and a display visible to an operator of the prime mover. A method of removing a marker from pavement includes positioning the working tip of a tool at a predetermined distance from an edge of the marker embedded in the pavement; adjusting the implement to a predetermined angle relative to an upper surface of the pavement by rotating the implement until the leveling pointer is aligned with the target indicium; and advancing the implement to remove the marker from the pavement.

U.S. Pat. No. 6,619,755 for a "Machine for Automatically Removing Temporary Raised Pavement Markers (TRPMS) from Roadway Surfaces," issued on Sep. 16, 2003 to inventors Michael Christensen et al., provides for an apparatus for removing temporary raised pavement markers (TRPM) from roadway surfaces, and comprises a platform, and a plurality of cutter blades rotatably disposed beneath the platform for encountering and severing the upstanding vertical reflective portions of the temporary raised pavement markers (TRPM). The cutter blades are driven by a motor mounted upon an upper surface portion of the platform, and a blower is also mounted upon the upper surface portion of the platform. An upstream intake duct, fluidically connected to the intake side of the blower, passes through a rear end portion of the platform so as to be fluidically connected to the underside of the platform, and in this manner, the severed upper n portions of the temporary raised pavement markers (TRPM) may be removed from the roadway surface and conveyed to a suitable debris collection bag.

U.S. Pat. No. 6,042,299 for an "Apparatus for Removal and Collection of Roadway Markers," issued on Mar. 28, 2000 to inventor George A. Cooper, provides for an apparatus for removal and collection of roadway markers, and comprises a shearing blade and a collection bin mountable on a transport vehicle, the blade being forwardly disposed relative to the collecting bin, the bin having no substantial front wall. A flexible vertical skirt is disposed in forwardly surrounding relation to the blade to effect the trapping of the removed markers and the deposit thereof into the collecting bin. The collecting bin is vertically movable to a dumping position relative to a larger storage bin.

U.S. Pat. No. 5,605,381 for a "Pavement Marking Eradicator," issued on Feb. 25, 1997 to inventors Carl J. Schmoock, Jr. et al., provides for a pavement marking eradicator for removing pavement marking from pavement. The eradicator has a grinding apparatus having a safety skirt to which is mounted a collector of a vacuum system. The vacuum system also has a cyclone for collecting and filtering debris created by the grinding apparatus during operation.

SUMMARY OF THE INVENTION

This invention provides a raised pavement markers removal vehicle system and method for the removal of raised pavement markers from a roadway. As the vehicle is driven along a roadway, a grinder unit alongside the forward portion of the vehicle grinds away the raised pavement markers to be removed. A sensing unit senses the relative lateral positions of the grinder unit and the upcoming raised pavement markers to be removed. A controller receives position information from the sensing unit and sends appropriate commands to an alignment adjuster to match the lateral position of the grinder unit to the lateral position of the upcoming pavement markers to be removed. After removal by grinding, the debris from the removed raised pavement markers is swept from the roadway into a sweeper-hopper unit for transport to a suitable unloading place. A warning board mounted at the rear of the sweeper-hopper unit provides a visual warning to other users of the road.

BRIEF DESCRIPTION OF THE DRAWINGS

Reference will now be made to the drawings, wherein like parts are designated by like numerals, and wherein.

DETAILED DESCRIPTION OF THE INVENTION

Figure 1:
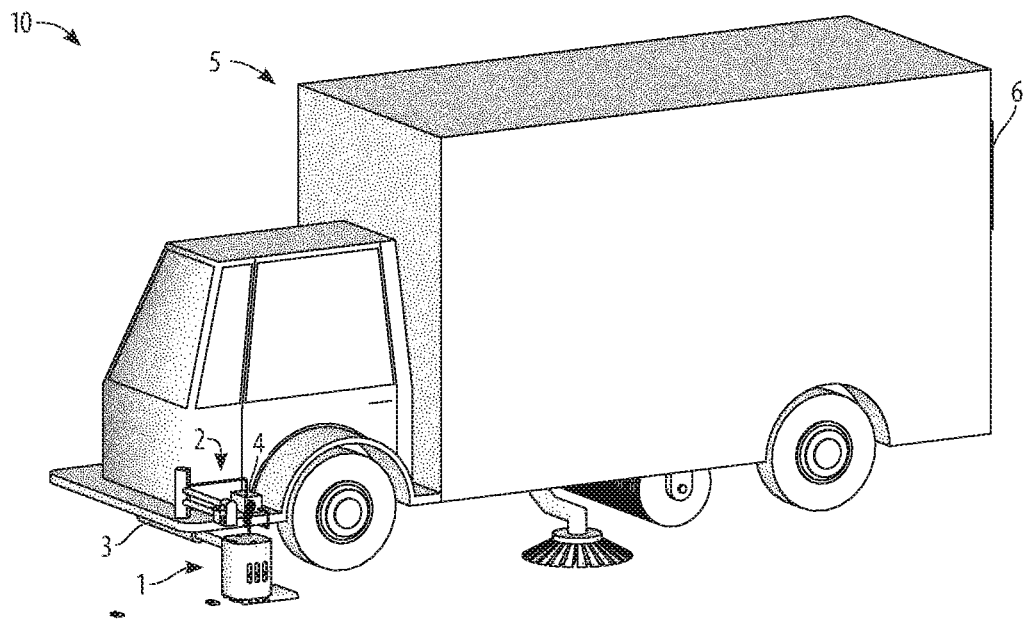
FIG. 1 is an upper perspective view of a first embodiment of the raised pavement markers removal vehicle of the invention.
Figure 2:
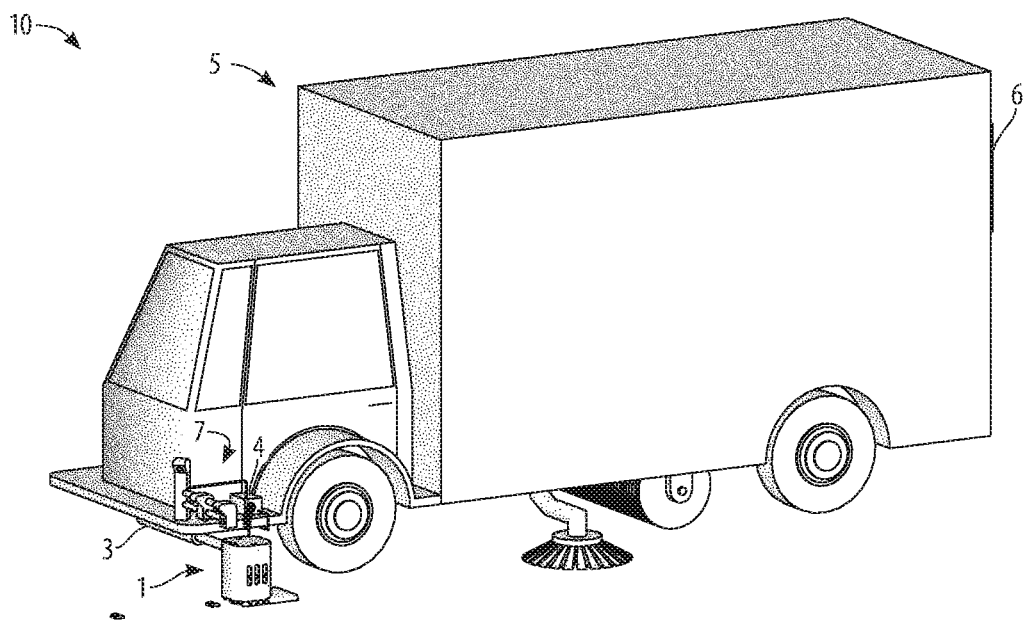
FIG. 2 is an upper perspective view of a second embodiment of the raised pavement markers removal vehicle of the invention.

Referring to FIG. 1 and FIG. 2, the raised pavement markers removal vehicle system and method provides for the removal of raised pavement markers from a roadway. As the vehicle is driven along a roadway, a grinder unit 1 alongside the forward portion of the vehicle grinds away the raised pavement markers to be removed. A sensing unit senses the relative lateral positions of the grinder unit 1 and the upcoming raised pavement markers to be removed. In a first embodiment, the sensing unit is a dual camera unit 2. In a second embodiment, the sensing unit is a cameras-plus-active unit 7. A controller 4 receives position information from the sensing unit and sends appropriate commands to an alignment adjuster 3 to match the lateral position of the grinder unit 1 to the lateral position of the upcoming pavement markers to be removed. After removal by grinding, the debris from the removed raised pavement markers is swept from the roadway into a sweeper-hopper unit 5 for transport to a suitable unloading place. A warning board 6 mounted at the rear of the sweeper-hopper unit 5 provides a visual warning to other users of the road, such as vehicles approaching from behind. This warning might be in the form of a large flashing arrow or the like.

The alignment adjuster 3, under command of the controller 4, pushes or pulls the grinder unit 1 laterally to align with upcoming raised pavement markers to be removed. The alignment adjuster 3 can be a hydraulic or pneumatic ram, a geared device such as a rack and pinion, a threaded rod device, or the like.

The controller 4 can be assembled from dedicated circuitry or can be programmed on a microcontroller able to withstand the applicable operating conditions.

Figure 3:
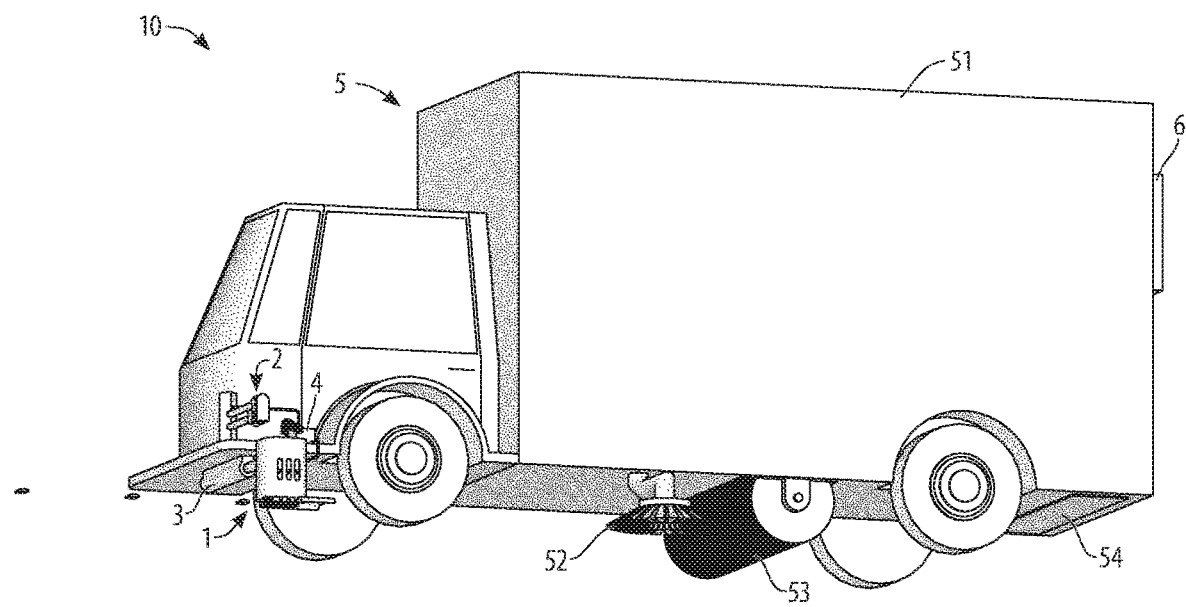
FIG. 3 is a lower perspective view of a first embodiment of the raised pavement markers removal vehicle of the invention.
Figure 4:
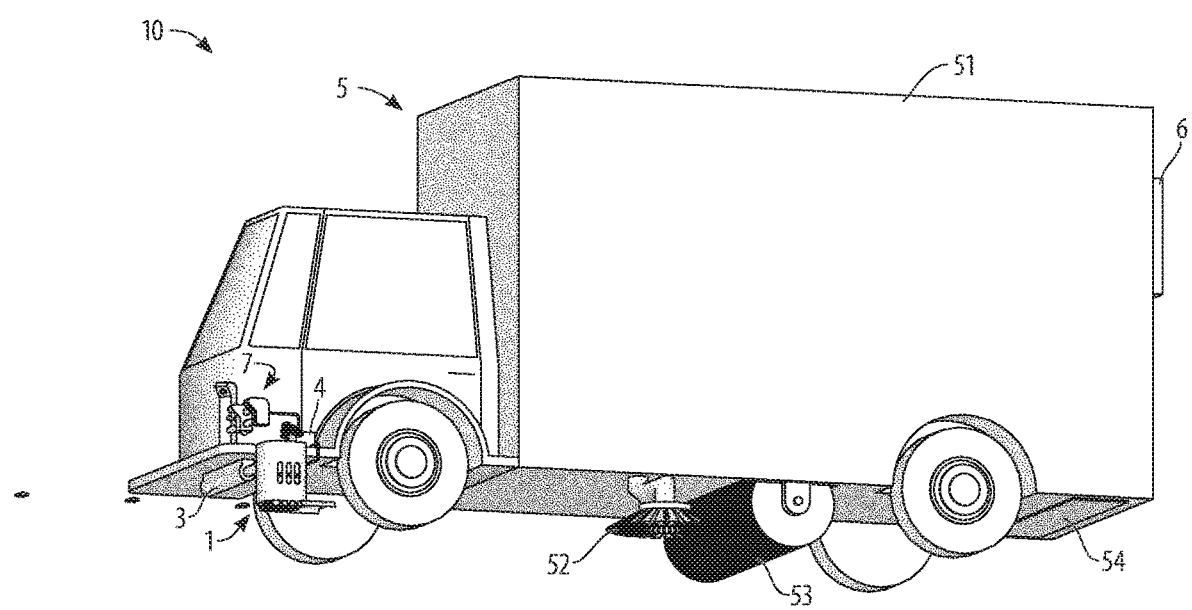
FIG. 4 is a lower perspective view of a second embodiment of the raised pavement markers removal vehicle of the invention.

Referring to FIG. 3 and FIG. 4, the sweeper-hopper unit 5 provides a debris hopper 51 to contain the debris from the removed raised pavement markers, a sweep-under broom 52 to move the debris from alongside the vehicle to underneath the vehicle, a debris-collection broom 53 to sweep the debris from underneath the vehicle into the debris hopper 51, and a debris unloader 54 to empty or dump the debris.

Figure 5:
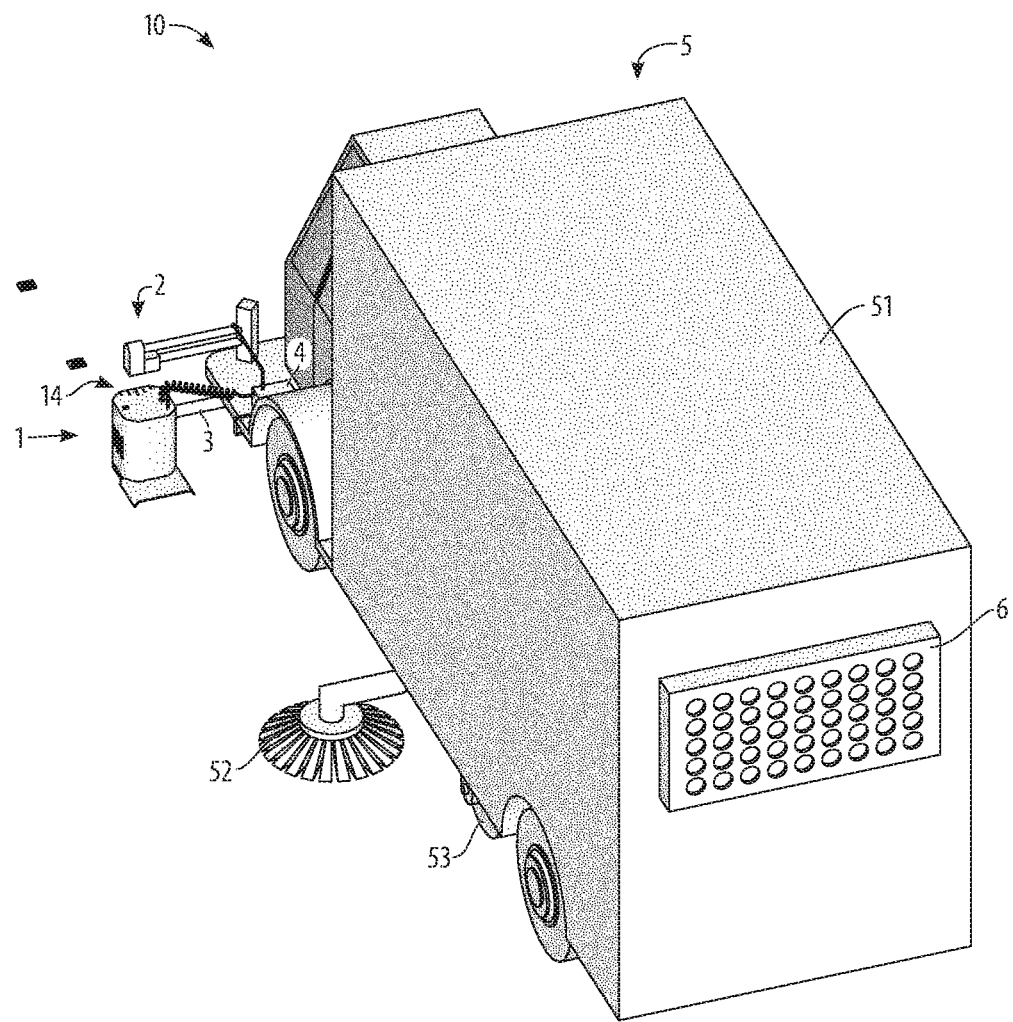
FIG. 5 is a rear perspective view of a first embodiment of the raised pavement markers removal vehicle of the invention.
Figure 6:
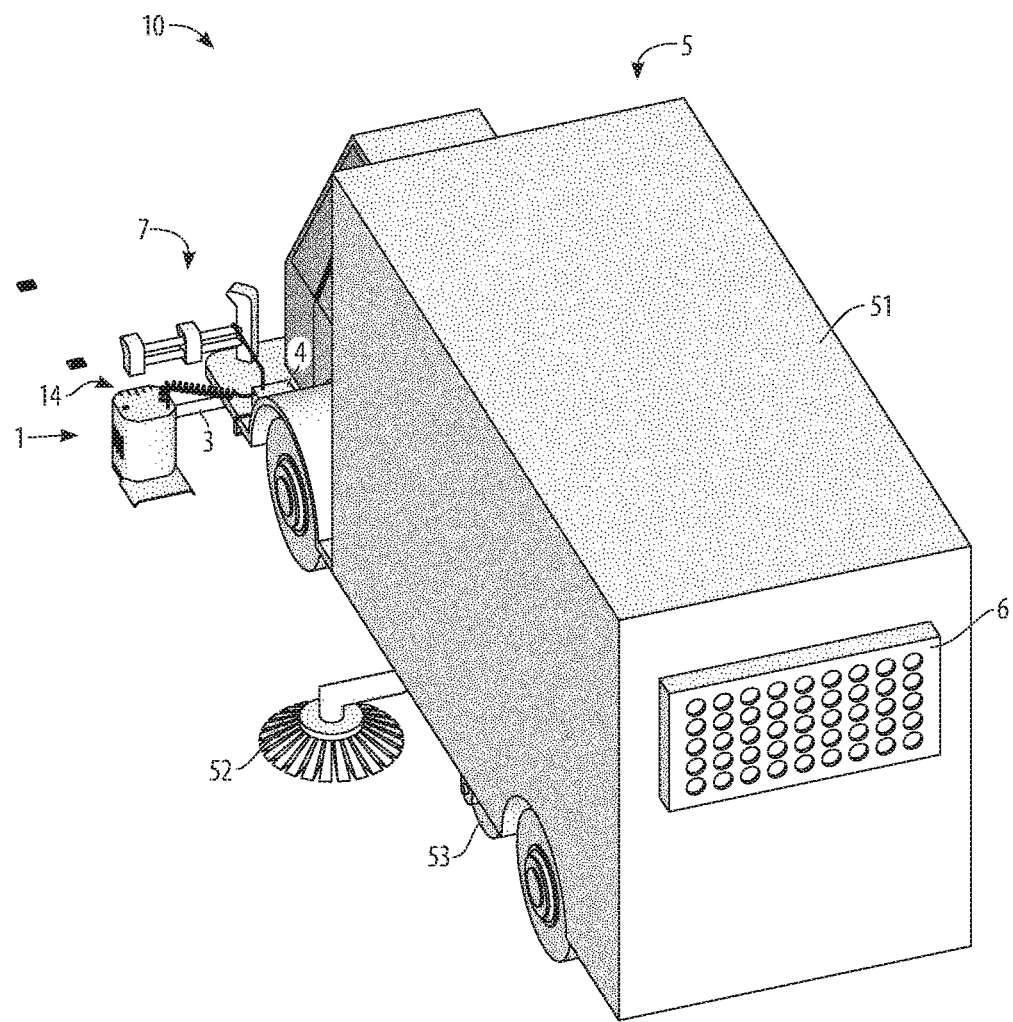
FIG. 6 is a rear perspective view of a second embodiment of the raised pavement markers removal vehicle of the invention.

The relative locations and alignments, in use, of the grinder unit 1, sensing unit 2, 7, sweep-under broom 52, debris-collection broom 53, and debris hopper 51 are shown in FIG. 5 and FIG. 6. The sensing unit, either the dual camera unit 2 or the cameras-plus-active unit 7 are placed above the grinder unit 1 such that grinder-positioning markings 14 placed at the top of the grinder unit 1 are visible.

Figure 7:
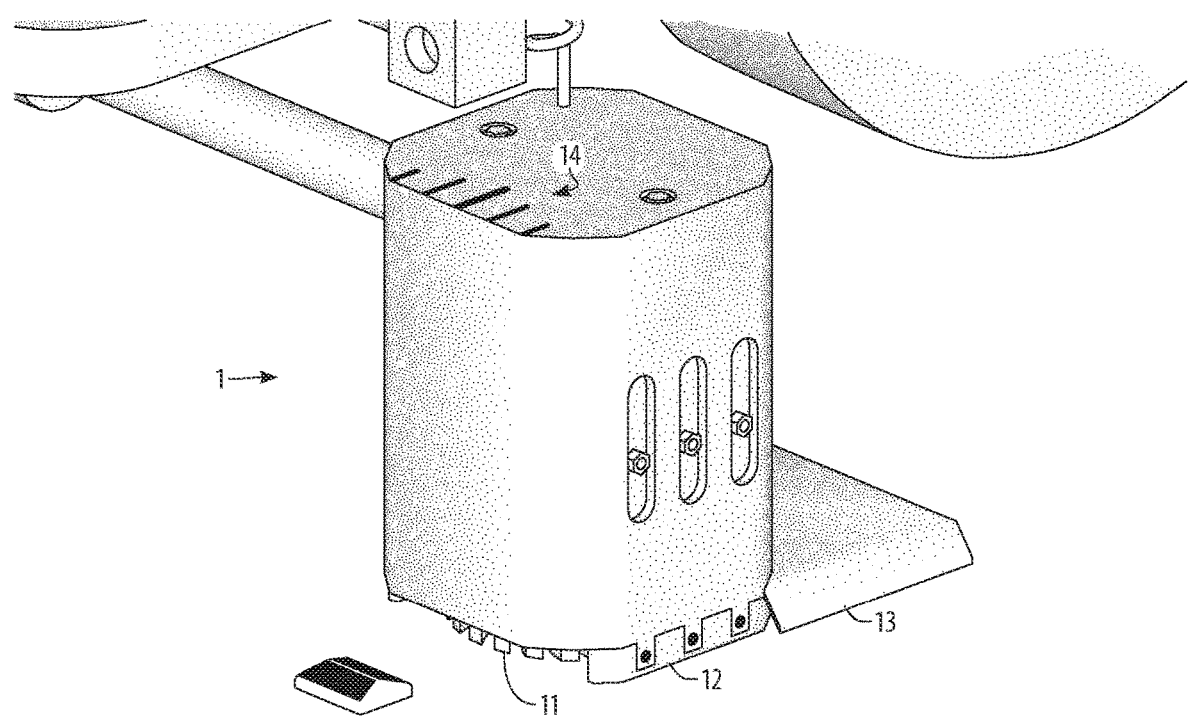
FIG. 7 is a detailed view of the grinder unit of the raised pavement markers removal vehicle of the invention.

Referring to FIG. 7, the grinder unit 1 provides a rotary grinder 11 to grind away raised pavement markers, replaceable skids 12 to provide for sliding contact with the roadway, and a debris guide shield 13 to prevent debris from exiting at a dangerous velocity and to guide the debris into a controlled location as a tail of debris directly behind the grinder unit 1. The replaceable skids 12 can be made of a material such as PTFE for low-resistance sliding and long use. Grinder-positioning markings 14 are provided at the top of the grinder unit 1 to indicate the lateral position of the rotary grinder 11 when viewed from the position of the sensing unit.

Figure 8:
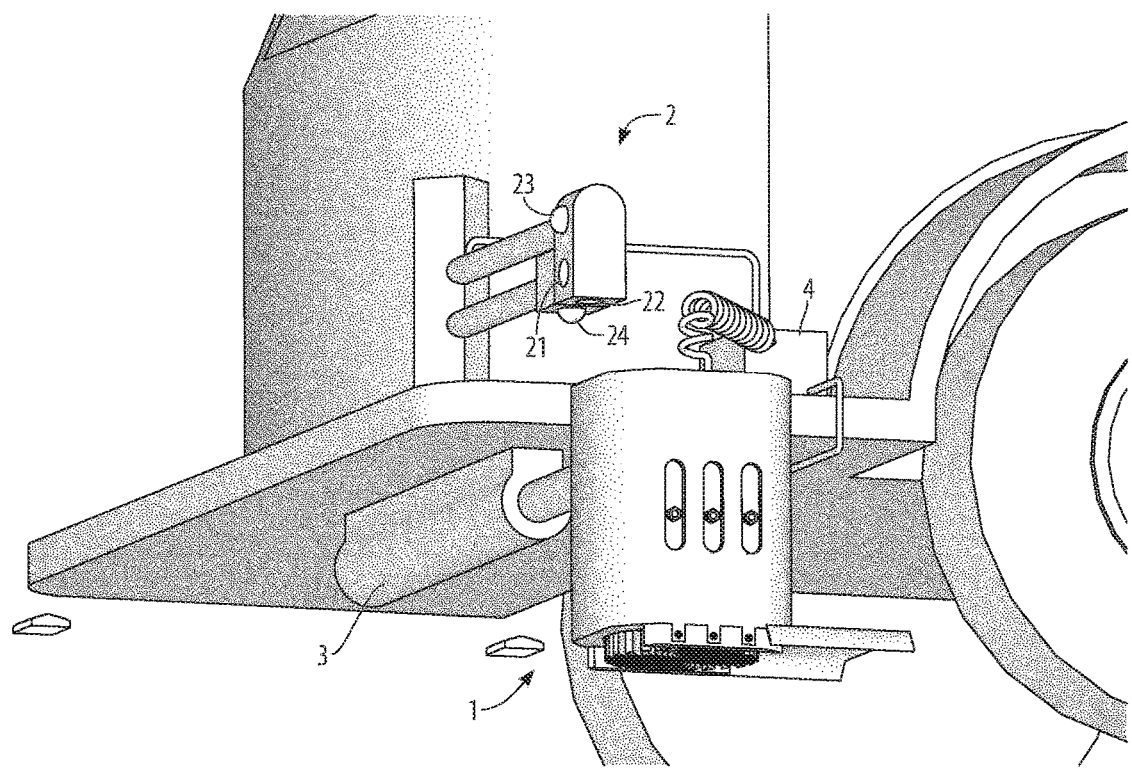
FIG. 8 is a lower rearward detail view of a first embodiment of the raised pavement markers removal vehicle of the invention.
Figure 9:
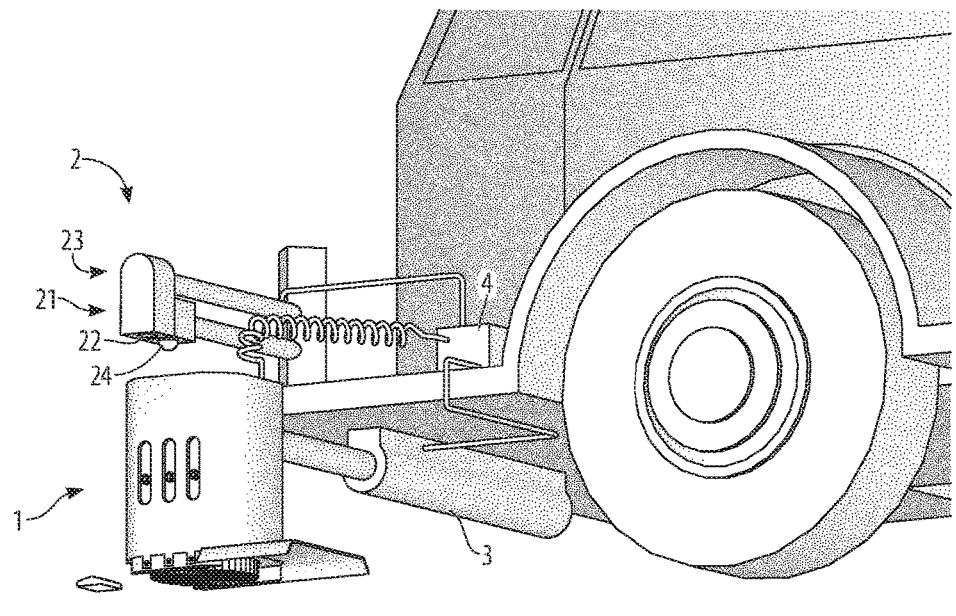
FIG. 9 is a lower forward detail view of a first embodiment of the raised pavement markers removal vehicle of the invention.

Referring to FIG. 8 and FIG. 9, in a first embodiment of the raised pavement markers removal vehicle system 10, a dual camera unit 2 is mounted to the vehicle extending above the grinder unit 1. The dual camera unit 2 provides a front camera 21 pointed toward the upcoming raised pavement markers to be removed, and a down camera 22 pointed downward toward the grinder-positioning markings 14 at the top of the grinder unit 1. The down camera 22 can be placed such that the roadway immediately ahead of the grinder unit 1 is also visible. At least one light is provided for operation in dark conditions. The embodiment shown provides a front light 23 and a down light 24. In use, the dual camera unit 2 senses the lateral position of upcoming raised pavement markers to be removed relative to the lateral position of the grinder unit 1, and sends that information to the controller 4, which, in turn, sends appropriate commands to the alignment adjuster 3 to move the grinder unit 1 into the appropriate lateral position, lining up with the raised pavement markers to be removed.

Figure 10:
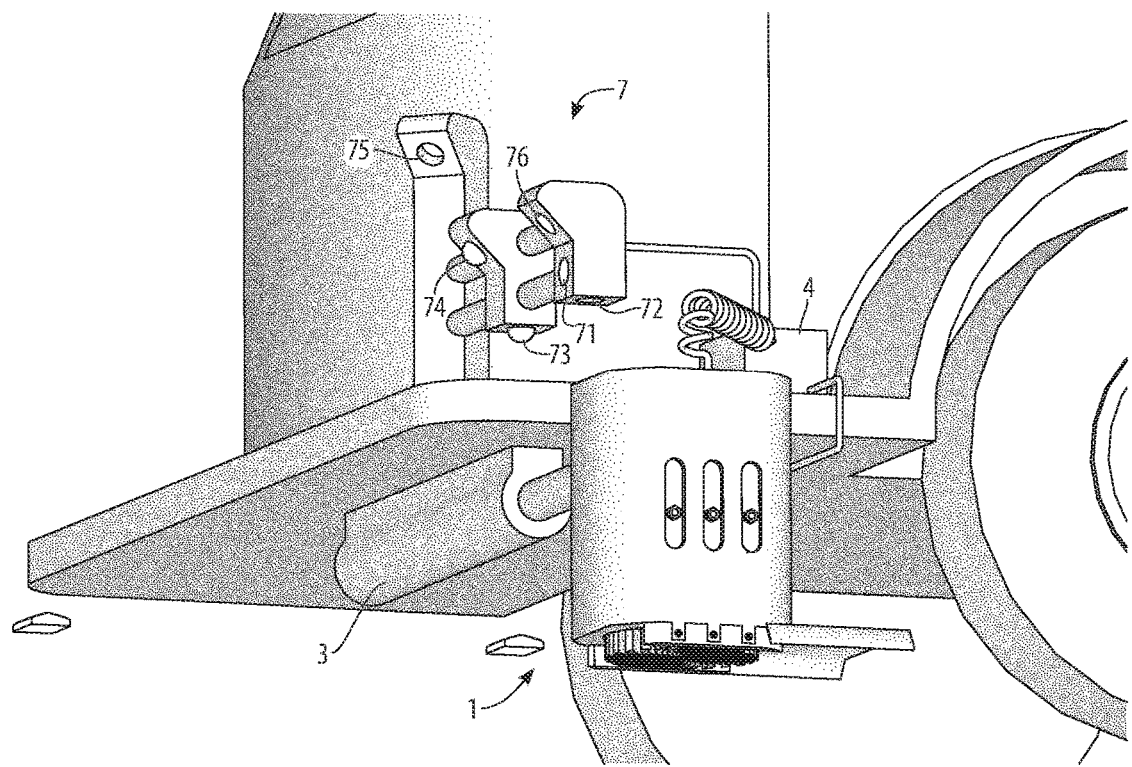
FIG. 10 is a lower rearward detail view of a second embodiment of the raised pavement markers removal vehicle of the invention.
Figure 11:
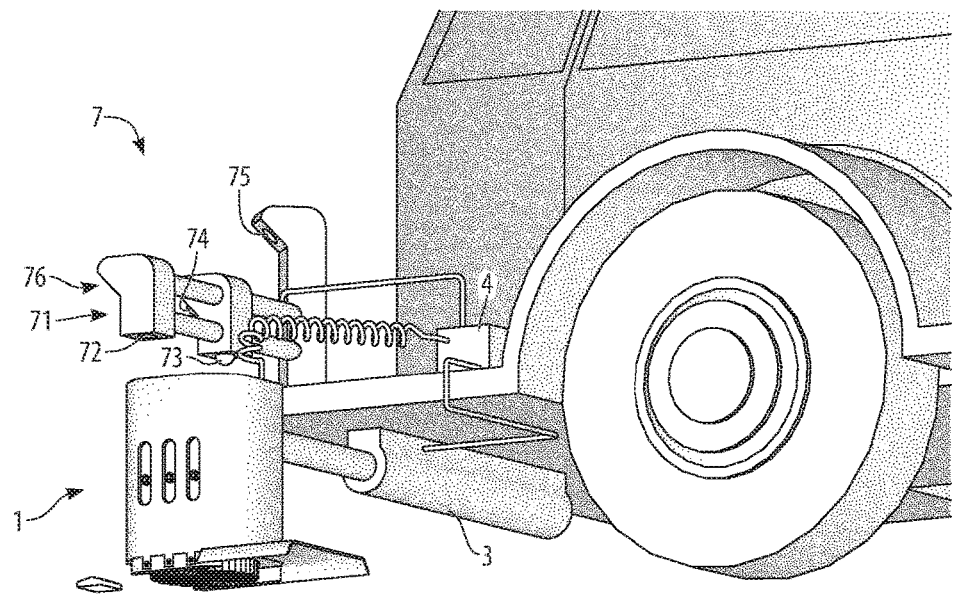
FIG. 11 is a lower forward detail view of a second embodiment of the raised pavement markers removal vehicle of the invention.

Referring to FIG. 10 and FIG. 11, in a second embodiment of the raised pavement markers removal vehicle system 10, a cameras-plus-active unit 7 is mounted to the vehicle extending above the grinder unit 1. The cameras-plus-active unit 7 provides a front camera 71 pointed toward the upcoming raised pavement markers to be removed, and a down camera 72 pointed downward toward the grinder-positioning markings 14 at the top of the grinder unit 1. The down camera 72 can be placed such that the roadway immediately ahead of the grinder unit 1 is also visible. At least one light 73 is provided for operation in dark conditions. Additionally, an active-signal emitter 74, a first active-signal receiver 75, and a second active-signal receiver 76 are provided for sensing using alternative active means. The active signal can be ultrasound, laser, radio frequency, sound frequency, or lightwave frequency including ultraviolet, visible, and infrared. The operating principle is that the active signal is reflected by the raised pavement markers to be removed and the reflections are detected by the two receivers, which are separated by a known distance and fixed in known positions relative to each other and to the emitter. The differences in the reflections detected by the two receivers provide information such as the position and the speed of approach of the raised pavement markers. In use, the cameras-plus-active unit 7 senses the lateral position of upcoming raised pavement markers to be removed relative to the lateral position of the grinder unit 1, and sends that information to the controller 4, which, in turn, sends appropriate commands to the alignment adjuster 3 to move the grinder unit 1 into the appropriate lateral position, lining up with the raised pavement markers to be removed.

Figure 12:
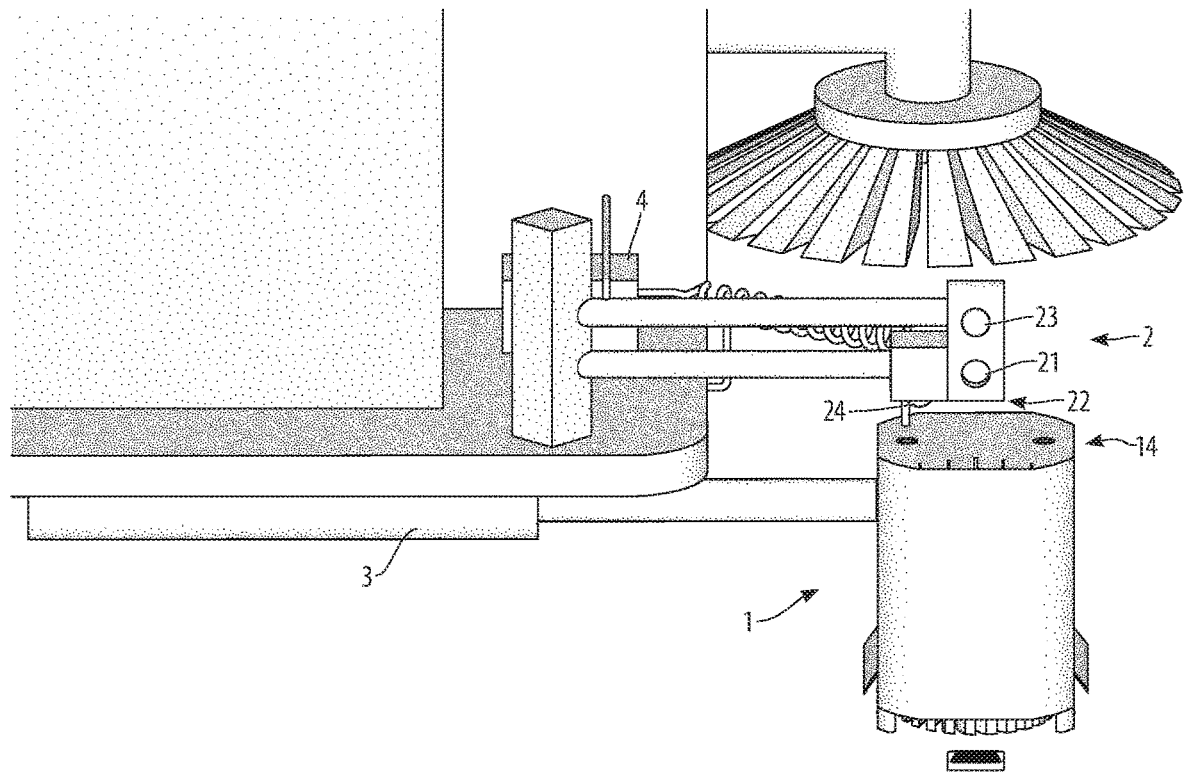
FIG. 12 is a front detail view of a first embodiment of the raised pavement markers removal vehicle of the invention.
Figure 13:
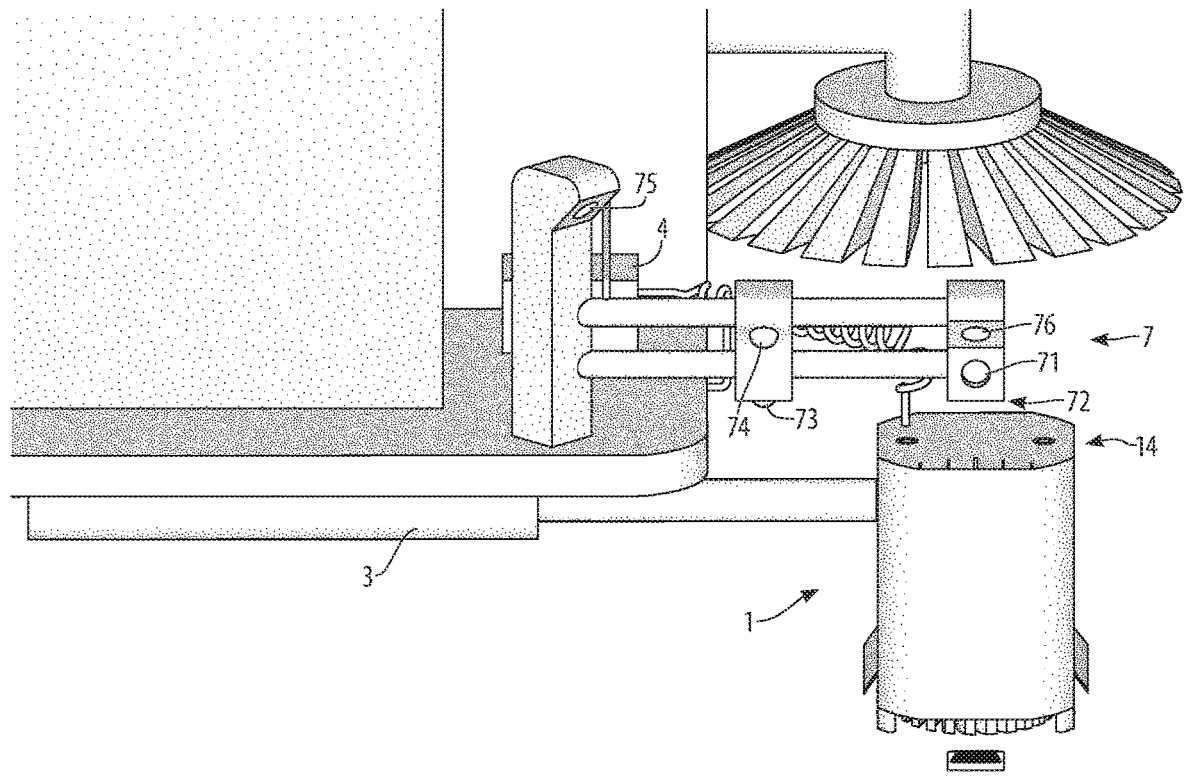
FIG. 13 is a front detail view of a second embodiment of the raised pavement markers removal vehicle of the invention.

Referring to FIG. 12 and FIG. 13, in use, the raised pavement markers removal vehicle system 10 provides for real-time sensing of the lateral position of raised pavement markers to be removed, through the dual camera unit 2 or the cameras-plus-active unit 7, and for movement of the grinder unit 1 into a corresponding position by an alignment adjuster 3 under the control of a controller 4, based on the information from the sensing unit.

Many other changes and modifications can be made in the system and method of the present invention without departing from the spirit thereof. I therefore pray that my rights to the present invention be limited only by the scope of the appended claims.

I claim:

1. A raised pavement markers removal vehicle system for installation on a vehicle having a forward-rearward orientation, for removal of raised pavement markers from a roadway, the raised pavement markers removal vehicle system comprising:
   (i) a sweeper-hopper unit having a debris hopper adapted to hold removal debris, a sweep-under broom adapted to sweep removal debris from alongside vehicle to underneath vehicle, a debris-collection broom adapted to sweep removal debris from underneath vehicle into said debris hopper, and a debris unloader adapted to empty removal debris from said debris hopper;
   (ii) a warning board mounted at a rear of said sweeper-hopper unit, adapted to provide a visual warning to other users of the roadway;
   (iii) a grinder unit mounted alongside a forward portion of the vehicle, having a rotary grinder adapted to grinding away raised pavement markers, replaceable skids adapted to provide sliding contact with the roadway, a debris guide shield adapted to prevent debris from exiting at a dangerous velocity and to guide debris into a controlled location, and grinder-positioning markings adapted to provide a representation of a lateral position of said rotary grinder;
   (iv) an alignment adjuster mounted between the vehicle and said grinder unit, adapted to adjust the lateral position of said rotary grinder in real time during operation;
   (v) a sensing unit mounted near said grinder unit, adapted to sense a lateral position of said grinder unit and to sense a lateral position of upcoming raised pavement markers to be removed, in real time during use; and
   (vi) a controller adapted to receive and analyze lateral-position information from said sensing unit and to send appropriate commands to said alignment adjuster to move said grinder unit into the lateral position of upcoming raised pavement markers to be removed, in real time during use.

2. The raised pavement markers removal vehicle system of claim 1, where said sensing unit further comprises a dual camera unit having a front camera adapted to sense the lateral position of upcoming raised pavement markers, a down camera adapted to sense the lateral position of said grinder unit, and at least one light adapted to provide illumination for said front camera and said down camera.

3. The raised pavement markers removal vehicle system of claim 1, where said sensing unit further comprises a cameras-plus-active unit having a front camera adapted to sense the lateral position of upcoming raised pavement markers, a down camera adapted to sense the lateral position of said grinder unit, at least one light adapted to provide illumination for said front camera and said down camera, an active-signal emitter adapted to emit a signal to be reflected by upcoming raised pavement markers, and a first active-signal receiver and second active-signal receiver adapted to receive reflected signals and to determine the lateral position and distance of upcoming raised pavement markers by analysis of differential reflection times.

4. The raised pavement markers removal vehicle system of claim 1, where said sensing unit further comprises a cameras-plus-active unit having a front camera adapted to sense the lateral position of upcoming raised pavement markers, a down camera adapted to sense the lateral position of said grinder unit, at least one light adapted to provide illumination for said front camera and said down camera, an active-signal emitter adapted to emit an ultrasound signal to be reflected by upcoming raised pavement markers, and a first active-signal receiver and second active-signal receiver adapted to receive reflected ultrasound signals and to determine the lateral position and distance of upcoming raised pavement markers by analysis of differential reflection characteristics.

5. The raised pavement markers removal vehicle system of claim 1, where said sensing unit further comprises a cameras-plus-active unit having a front camera adapted to sense the lateral position of upcoming raised pavement markers, a down camera adapted to sense the lateral position of said grinder unit, at least one light adapted to provide illumination for said front camera and said down camera, an active-signal emitter adapted to emit a laser signal to be reflected by upcoming raised pavement markers, and a first active-signal receiver and second active-signal receiver adapted to receive reflected laser signals and to determine the lateral position and distance of upcoming raised pavement markers by analysis of differential reflection characteristics.

6. The raised pavement markers removal vehicle system of claim 1, where said sensing unit further comprises a cameras-plus-active unit having a front camera adapted to sense the lateral position of upcoming raised pavement markers, a down camera adapted to sense the lateral position of said grinder unit, at least one light adapted to provide illumination for said front camera and said down camera, an active-signal emitter adapted to emit a lightwave signal to be reflected by upcoming raised pavement markers, and a first active-signal receiver and second active-signal receiver adapted to receive reflected lightwave signals and to determine the lateral position and distance of upcoming raised pavement markers by analysis of differential reflection characteristics.

7. The raised pavement markers removal vehicle system of claim 1, where said sensing unit further comprises a cameras-plus-active unit having a front camera adapted to sense the lateral position of upcoming raised pavement markers, a down camera adapted to sense the lateral position of said grinder unit, at least one light adapted to provide illumination for said front camera and said down camera, an active-signal emitter adapted to emit a radio signal to be reflected by upcoming raised pavement markers, and a first active-signal receiver and second active-signal receiver adapted to receive reflected radio signals and to determine the lateral position and distance of upcoming raised pavement markers by analysis of differential reflection characteristics.

8. The raised pavement markers removal vehicle system of claim 1, where said sensing unit further comprises a cameras-plus-active unit having a front camera adapted to sense the lateral position of upcoming raised pavement markers, a down camera adapted to sense the lateral position of said grinder unit, at least one light adapted to provide illumination for said front camera and said down camera, an active-signal emitter adapted to emit a sound signal to be reflected by upcoming raised pavement markers, and a first active-signal receiver and second active-signal receiver adapted to receive reflected sound signals and to determine the lateral position and distance of upcoming raised pavement markers by analysis of differential reflection characteristics.

9. The raised pavement markers removal vehicle system of claim 1, where said replaceable skids are made from Polytetrafluoroethylene (PTFE).

10. The raised pavement markers removal vehicle system of claim 1, where said controller incorporates a microcontroller.

11. A raised pavement markers removal vehicle method comprising:
  (i) providing a raised pavement markers removal vehicle system comprising:
    (a) a sweeper-hopper unit having a debris hopper adapted to hold removal debris, a sweep-under broom adapted to sweep removal debris from alongside vehicle to underneath vehicle, a debris-collection broom adapted to sweep removal debris from underneath vehicle into said debris hopper, and a debris unloader adapted to empty removal debris from said debris hopper; (b) a warning board mounted at a rear of said sweeper-hopper unit, adapted to provide a visual warning to other users of a roadway;
    (c) a grinder unit mounted alongside a forward portion of the vehicle, having a rotary grinder adapted to grinding away raised pavement markers, replaceable skids adapted to provide sliding contact with the roadway, a debris guide shield adapted to prevent debris from exiting at a dangerous velocity and to guide debris into a controlled location, and grinder-positioning markings adapted to provide a representation of a lateral position of said rotary grinder;
    (d) an alignment adjuster mounted between the vehicle and said grinder unit, adapted to adjust the lateral position of said rotary grinder in real time during operation;
    (e) a sensing unit mounted near said grinder unit, adapted to sense a lateral position of said grinder unit and to sense a lateral position of upcoming raised pavement markers to be removed, in real time during use; and
    (f) a controller adapted to receive and analyze lateral-position information from said sensing unit and to send appropriate commands to said alignment adjuster to move said grinder unit into the lateral position of upcoming raised pavement markers to be removed, in real time during use;

(ii) operating said raised pavement markers removal vehicle along the roadway having raised pavement markers to be removed;
(iii) locating upcoming raised pavement markers to be removed;
(iv) adjusting the lateral position of said grinder unit;
(v) removing raised pavement markers to be removed; and (vi) sweeping debris from removed markers into said sweeper-hopper unit for further handling.

12. The raised pavement markers removal vehicle method of claim 11, where said sensing unit further comprises a dual camera unit having a front camera adapted to sense the lateral position of upcoming raised pavement markers, a down camera adapted to sense the lateral position of said grinder unit, and at least one light adapted to provide illumination for said front camera and said down camera.

13. The raised pavement markers removal vehicle method of claim 11, where said sensing unit further comprises a cameras-plus-active unit having a front camera adapted to sense the lateral position of upcoming raised pavement markers, a down camera adapted to sense the lateral position of said grinder unit, at least one light adapted to provide illumination for said front camera and said down camera, an active-signal emitter adapted to emit a signal to be reflected by upcoming raised pavement markers, and a first active-signal receiver and second active-signal receiver adapted to receive reflected signals and to determine the lateral position and distance of upcoming raised pavement markers by analysis of differential reflection times.

14. The raised pavement markers removal vehicle method of claim 11, where said sensing unit further comprises a cameras-plus-active unit having a front camera adapted to sense the lateral position of upcoming raised pavement markers, a down camera adapted to sense the lateral position of said grinder unit, at least one light adapted to provide illumination for said front camera and said down camera, an active-signal emitter adapted to emit an ultrasound signal to be reflected by upcoming raised pavement markers, and a first active-signal receiver and second active-signal receiver adapted to receive reflected ultrasound signals and to determine the lateral position and distance of upcoming raised pavement markers by analysis of differential reflection characteristics.

15. The raised pavement markers removal vehicle method of claim 11, where said sensing unit further comprises a cameras-plus-active unit having a front camera adapted to sense the lateral position of upcoming raised pavement markers, a down camera adapted to sense the lateral position of said grinder unit, at least one light adapted to provide illumination for said front camera and said down camera, an active-signal emitter adapted to emit a laser signal to be reflected by upcoming raised pavement markers, and a first active-signal receiver and second active-signal receiver adapted to receive reflected laser signals and to determine the lateral position and distance of upcoming raised pavement markers by analysis of differential reflection characteristics.

16. The raised pavement markers removal vehicle method of claim 11, where said sensing unit further comprises a cameras-plus-active unit having a front camera adapted to sense the lateral position of upcoming raised pavement markers, a down camera adapted to sense the lateral position of said grinder unit, at least one light adapted to provide illumination for said front camera and said down camera, an active-signal emitter adapted to emit a lightwave signal to be reflected by upcoming raised pavement markers, and a first active-signal receiver and second active-signal receiver adapted to receive reflected lightwave signals and to determine the lateral position and distance of upcoming raised pavement markers by analysis of differential reflection characteristics.

17. The raised pavement markers removal vehicle method of claim 11, where said sensing unit further comprises a cameras-plus-active unit having a front camera adapted to sense the lateral position of upcoming raised pavement markers, a down camera adapted to sense the lateral position of said grinder unit, at least one light adapted to provide illumination for said front camera and said down camera, an active-signal emitter adapted to emit a radio signal to be reflected by upcoming raised pavement markers, and a first active-signal receiver and second active-signal receiver adapted to receive reflected radio signals and to determine the lateral position and distance of upcoming raised pavement markers by analysis of differential reflection characteristics.

18. The raised pavement markers removal vehicle method of claim 11, where said sensing unit further comprises a cameras-plus-active unit having a front camera adapted to sense the lateral position of upcoming raised pavement markers, a down camera adapted to sense the lateral position of said grinder unit, at least one light adapted to provide illumination for said front camera and said down camera, an active-signal emitter adapted to emit a sound signal to be reflected by upcoming raised pavement markers, and a first active-signal receiver and second active-signal receiver adapted to receive reflected sound signals and to determine the lateral position and distance of upcoming raised pavement markers by analysis of differential reflection characteristics.

19. The raised pavement markers removal vehicle method of claim 11, where said replaceable skids are made from Polytetrafluoroethylene (PTFE).

20. The raised pavement markers removal vehicle method of claim 11, where said controller incorporates a microcontroller.

* * * * *